Oct. 28, 1958  J. A. TROENDLE  2,857,810
MIRROR FOR VEHICLES
Filed June 22, 1953
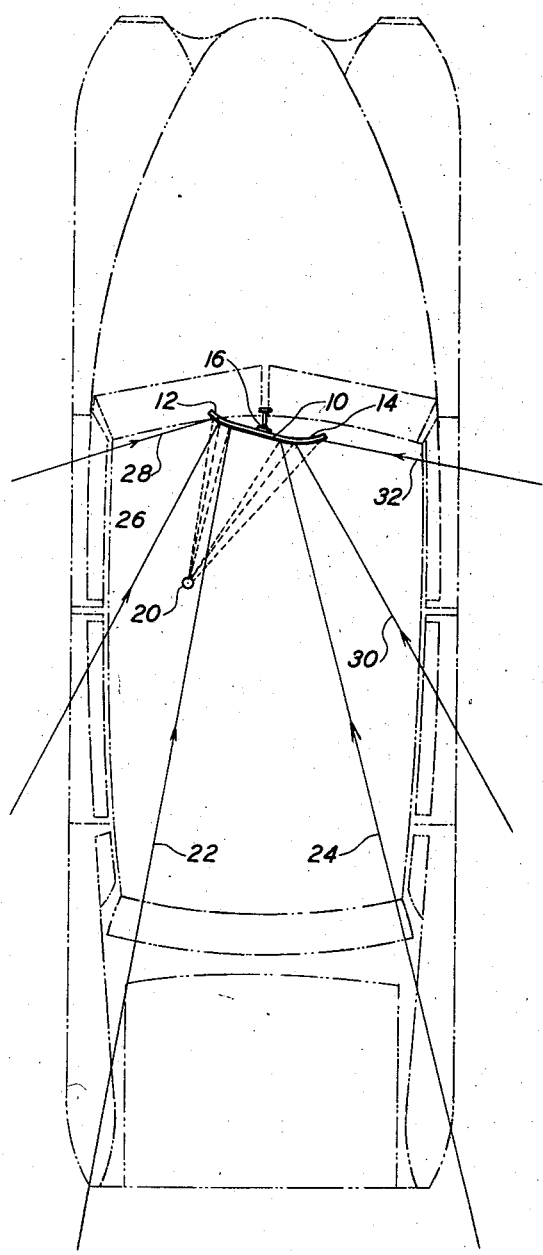
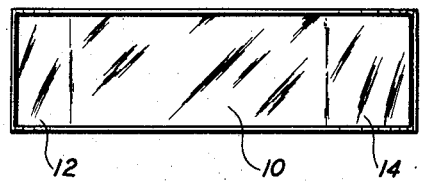
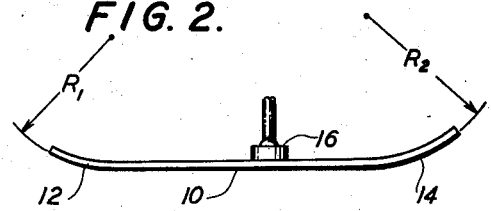
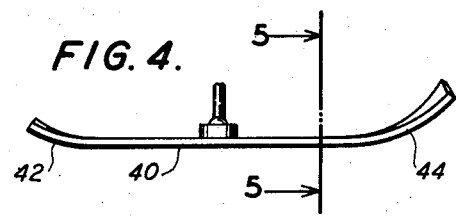
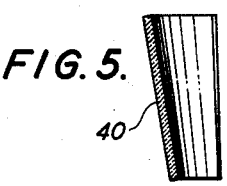
INVENTOR.
JEAN A. TROENDLE
BY
*James B Christie*
ATTORNEY

United States Patent Office 2,857,810
Patented Oct. 28, 1958

2,857,810

MIRROR FOR VEHICLES

Jean A. Troendle, Hollywood, Calif.

Application June 22, 1953, Serial No. 363,268

2 Claims. (Cl. 88—87)

This invention relates to improvements in mirrors for use in vehicles such as automobiles.

Ordinarily, flat mirrors of rectangular or of substantially rectangular shape are employed as rear vision mirrors in automobiles. With such a mirror, the driver can see automobiles that are in view through the rear window of the automobile, but ordinarily he cannot see automobiles which are on either side or which are in position to pass the driver's automobile.

In order to provide side vision as well as rear vision, mirrors located outside the automobile, a series of flat mirrors arranged inside the automobile adjacent the top of the windshield, and spherical mirrors located inside the automobile adjacent the top of the windshield have been employed.

All of these arrangements have serious shortcomings. Auxiliary mirrors located outside the automobile require that the driver move his line of vision from one mirror to another in order to see what is behind and at the side of his automobile, and in addition mirrors which are outside the automobile do not provide reliable vision during rainy or icy weather.

A series of flat mirrors arranged adjacent the top of the windshield is unsatisfactory because several mirrors which together extend almost all the way across the top of the windshield must be employed in order to provide side vision. The numerous mirrors are somewhat confusing to the driver, and a great deal of time is required for the driver to scan the mirrors in order to obtain side as well as rear vision. Moreover, a series of mirrors cannot be employed in many types of automobiles without interfering with the driver's vision through the windshield.

A spherical mirror is unsatisfactory because it distorts the images which are viewed through the rear window of the automobile, and it is confusing to drivers who are accustomed to conventional flat rear view mirrors.

These difficulties are overcome in large measure in the mirror of my invention by providing a mirror having a flat central portion with curved portions located at opposite ends of the central portion. The flat central portion of the mirror provides vision through the rear window of the automobile which corresponds to that provided by conventional rear vision mirrors. In addition, the curved end portions provide side vision through the windows along the two sides of the automobile.

I prefer to employ a unitary mirror having a flat central portion and curved end portions. With such an arrangement the view through the rear window of the automobile is not distorted, and the end portions of the mirror do not confuse the driver because the dividing lines between the two end portions and the central portion of the mirror are clearly apparent. Yet the end portions of the mirror permit vision through the side windows of the automobile so that the driver has both rear and side vision at one glance.

By employing curved end portions, a compact mirror is obtained. The images which are viewed through the end portions of the mirror are distorted due to the curvature of these portions; however, their position with respect to the driver's automobile can be ascertained at a glance by observing the window through which the image is received.

The end portions of the mirror may have various shapes and curvatures. It is desirable that the two end portions be curved along the length of the mirror and be straight along transverse planes in order to reduce distortion of the images.

Preferably, the flat central portion and the curved end portions of the mirror are disposed so as to provide a substantially constant angle between the line of sight of the driver and transverse planes along the mirror throughout its length. If the mirror is to be located at about eye level in the automobile, the end portions should ordinarily have cylindrical curvature. If the mirror is to be located above eye level in the automobile, the end portions should ordinarily have conical curvatures with the apexes of the cones located below the mirror. If the mirror is to be located below eye level in the automobile, the end portions should ordinarily have conical curvatures with the apexes of the cones located above the mirror.

Preferably the radius of curvature of the end of the mirror which is to be positioned closest to the driver is less than the radius of curvature of the other end of the mirror so that the distortion of the images which are viewed through the two end portions is substantially the same.

The invention is explained with reference to the drawings, in which:

Fig. 1 is an elevation view of one embodiment of the invention;

Fig. 2 is a plan view of the mirror of Fig. 1;

Fig. 3 shows the mirror of Figs. 1 and 2 mounted in an automobile;

Fig. 4 is a plan view of another embodiment of the invention; and

Fig. 5 is a sectional view along lines 5—5 of Fig. 4.

Figs. 1 to 3 illustrate an embodiment of the invention having end portions of cylindrical curvatures. The mirror is a unitary member for reflecting light having a flat central portion 10, preferably of rectangular shape, and two end portions 12 and 14 of cylindrical curvature, with the two end portions being curved along the length of the mirror but being straight along transverse planes.

The curvature of the two end portions 12, 14 need not be the same, and I prefer to employ a radius of curvature $R_1$ for the end of the mirror which is to be positioned closest to the driver which is less than the radius of curvature $R_2$ for the other end of the mirror. With such curvatures, the images which are viewed through the two end portions of the mirror have corresponding proportions when viewed from the driver's seat so that the distortion of the images is substantially the same.

A mount 16 is provided for attaching the mirror to the automobile. Preferably the mount 16 is located about midway between the ends of the mirror so that the weight of the mirror is balanced on each side of the mount.

Fig. 3 illustrates how rays of light from images at the sides and the back of an automobile are reflected by the mirror to be viewed by a driver at the location 20.

Any light rays entering the rear window between the rays 22 and 24 are reflected by the flat portion 10 of the mirror so that the rear vision is undistorted. Light rays entering the side windows, say along the lines 26, 28 and along the lines 30, 32 are reflected by the end portions 12, 14 to the location 20. The location of the objects which are viewed through the side windows with respect to the driver's car can be estimated with sufficient accuracy by observing the window through which they are viewed.

The size of the curved end portions 12, 14 of the mirror may be relatively small compared to the flat portion 10 of the mirror so that the driver can see along both sides of the automobile and to the rear at one glance without having to move his eyes to scan the mirror.

It is desirable that the flat central portion and the curved end portions of the mirror be disposed so as to provide a substantially constant angle between the line of sight of the driver and transverse planes along the mirror throughout its length. Such an arrangement provides maximum vision through both the side and the rear windows of the automobile.

The mirror shown in Figs. 1 and 2 is primarily suitable for use in automobiles in which the mirror is located at about the eye level of the driver. The line of sight of the driver with such an arrangement is approximately perpendicular with respect to transverse planes of the mirror along both the flat portion and the two end portions of cylindrical curvature.

The mirror shown in Figs. 4 and 5 is primarily suitable for use in automobiles in which the mirror is located above the eye level of the driver in the automobile. In this embodiment of the invention, the mirror comprises a flat central portion 40 having end portions 42 and 44 of conical curvature, with the apexes of the cones located below the mirror. The conical curvature of the end portions 42 and 44 provides proper side vision even though the mirror is inclined forward so as to obtain proper rear vision through the flat portion 40 of the mirror.

Preferably the curvature of the end portion 42 is less than that of the portion 44 as was the case for the corresponding portions of the embodiment of Fig. 2, so that the images which are viewed through the two end portions have corresponding proportions when viewed from the driver's seat.

If the mirror is to be located below eye level in the automobile, the end portions should ordinarily have conical curvatures similar to those of Figs. 4 and 5 but with the apexes of the cones located above the mirror.

It will be apparent that the curved end portions of the various embodiments of my invention may be formed separately from the flat central portion and that these curved end portions may be positioned adjacent the ends of the flat central portion so as to provide the desired rear and side vision. However, I prefer to employ a unitary mirror wherein the flat central portion and the curved end portions are integral parts of one member for reflecting light. Such an arrangement can be viewed at a single glance without having to scan the mirror.

I claim:

1. A mirror for automobiles which comprises a member for reflecting light having a substantially flat elongated central portion with each end of the central portion terminating in a single curved portion having conical curvature and having substantially the same reflective properties as the central portion, with the apexes of the portions of conical curvature being located to one side of the elongated portion, so that the mirror may be employed in an automobile to permit vision through the windows on either side of the automobile as well as through the rear window of the automobile.

2. A mirror for automobiles which comprises a member for reflecting light having a substantially flat central portion and end portions of conical curvature which curve toward the rear of the mirror, with the curvature of one end portion being greater than the curvature of the other end portion.

References Cited in the file of this patent

UNITED STATES PATENTS

| | | |
|---|---|---|
| 1,643,420 | Porter | Sept. 27, 1927 |
| 1,872,905 | Darling | Aug. 23, 1932 |
| 2,520,437 | Sachs | Aug. 29, 1950 |
| 2,778,273 | Fellmeth | Jan. 22, 1957 |